United States Patent
Chaki et al.

[11] Patent Number: 6,141,397
[45] Date of Patent: Oct. 31, 2000

[54] BOILING WATER REACTOR CORE, BOILING WATER REACTOR, AND METHOD OF OPERATING BOILING WATER REACTOR

[75] Inventors: Masao Chaki, Hitachi; Koji Nishida, Hitachiohta, both of Japan

[73] Assignee: Hitachi, Ltd., Tokyo, Japan

[21] Appl. No.: 09/334,624

[22] Filed: Jun. 17, 1999

[30] Foreign Application Priority Data

Jun. 19, 1998 [JP] Japan .................................. 10-173583

[51] Int. Cl.[7] ....................................................... G21C 1/04
[52] U.S. Cl. ........................... 376/352; 376/377; 376/444
[58] Field of Search .................................... 376/350, 352, 376/370, 443, 444, 435

[56] References Cited

U.S. PATENT DOCUMENTS

| | | | |
|---|---|---|---|
| 3,528,885 | 9/1970 | Kumpf ....................................... | 176/78 |
| 4,708,846 | 11/1987 | Patterson et al. ......................... | 376/444 |
| 4,803,044 | 2/1989 | Patterson ................................. | 376/444 |
| 5,023,047 | 6/1991 | Nishida et al. .......................... | 376/370 |
| 5,251,246 | 10/1993 | Matzner ................................... | 376/444 |
| 5,528,641 | 6/1996 | Takeuchi et al. ........................ | 376/444 |
| 5,617,456 | 4/1997 | Kurosaki et al. ........................ | 376/260 |
| 5,640,435 | 6/1997 | Kurosaki et al. ........................ | 376/444 |

FOREIGN PATENT DOCUMENTS

| | | |
|---|---|---|
| 63-73187 | 4/1988 | Japan . |
| 1-195393 | 8/1989 | Japan . |
| 7-89158 | 9/1995 | Japan . |

OTHER PUBLICATIONS

Moriya et al., "Development of Future BWRs for 21 Century", *The Hitachi Hyoron*, vol. 74, No. 10 (1992), pp. 55–60.

*Primary Examiner*—Charles T. Jordan
*Assistant Examiner*—Kyoytaek K. Mun
*Attorney, Agent, or Firm*—Antonelli, Terry, Stout & Kraus, LLP

[57] ABSTRACT

In each of a number of fuel assemblies loaded in a core of a boiling water reactor, a fuel holding portion of a lower tie plate holds lower end portions a plurality of fuel rods and at least one water rod. The water rod includes a rising pipe opened to a space in the lower tie plate below the fuel holding portion and introducing upward a coolant introduced to the rising pipe, and a falling pipe communicated with the rising pipe and introducing downward the coolant introduced through the rising pipe. The falling pipe has a coolant outlet opened to a second coolant passage defined between the fuel rods above the fuel holding portion. The rising passage is filled with the coolant during a period of rated power operation of the reactor, and a surface of the coolant is formed in the rising pipe during a period of non-rated power operation in which a flow rate of the coolant supplied to the fuel assemblies is lower than that during the period of rated power operation. As a result, influences of a transient event during the rated power operation can be suppressed, and the nuclear thermal-hydraulic stability of the core during the non-rated power operation can be improved.

13 Claims, 13 Drawing Sheets

HEIGHT h FROM UPPER SURFACE OF FUEL ROD HOLDING PORTION TO COOLING WATER OUTLET ( 24-DIVISION NODES RELATIVE TO FUEL EFFECTIVE LENGTH L )

HEIGHT h FROM UPPER SURFACE OF FUEL ROD HOLDING PORTION TO COOLING WATER OUTLET ( 24-DIVISION NODES RELATIVE TO FUEL EFFECTIVE LENGTH L )

BOILING WATER REACTOR CORE, BOILING WATER REACTOR, AND METHOD OF OPERATING BOILING WATER REACTOR

BACKGROUND OF THE INVENTION

1. Field of the Invention

The present invention relates to a boiling water reactor core including a water rod, a boiling water reactor including the core, and a method of operating the boiling water reactor.

2. Description of the Related Art

Usually, a core of a boiling water reactor (BWR) includes a number of fuel assemblies arrayed in the form of a square lattice. Each of the fuel assemblies comprises a number of fuel rods arrayed in the form of a square lattice, and at least one water rod disposed near a center position of the array of the fuel rods. A channel box surrounds an outer periphery of a fuel bundle of the fuel rods held together by a fuel spacer. The fuel rods each include a number of fuel pellets filled in a cladding pipe made of an zirconium alloy, for example. Most of the fuel pellets are each made up of enriched uranium having an increased concentration of U-235 that is a fissile material.

The water rod is a hollow pipe which takes in water as a coolant through an opening formed in its lower portion, and allows the water to flow out through an opening formed in its upper portion. This water circulation increases a neutron moderating effect in a central portion of the fuel assembly in horizontal section, and enhance nuclear fission in the central portion. Various structures of the water rod have been proposed in the past. Recently, a water rod including a rising pipe and a falling pipe communicated with the rising pipe has been proposed. Such water rods are disclosed in JP, A, 63-73187, U.S. Pat. No. 5,023,047, U.S. Pat. No. 5,640,435, and Hitachi Hyoron, Vol. 74, No. 10 (1992), pp. 55–60 (especially FIG. 5 in page 58). The rising pipe has a lower end opened below an upper surface of a lower tie plate which holds lower end portions of fuel rods. The falling pipe has a lower end opened above the upper surface of the lower tie plate. In the disclosed water rods, a difference between a pressure at the lower end opening of the rising pipe and a pressure at the lower end opening of the falling pipe is equal to a pressure loss occurred in a flow passage above the upper surface of the lower tie plate. During reactor operation, therefore, the surface of water in the rising pipe takes a level that gives a density head corresponding to the pressure loss, and the level of the water surface changes vertically depending on an increase and decrease in flow rate of cooling water passing through a core (i.e., in core flow rate). The above-mentioned water rods are called spectral shift rods.

A nuclear reactor is shut down to replace a part of fuel assemblies in a reactor core. During shutdown of the reactor core, the fuel assemblies whose lifetime has expired are taken out of the core, and new fuel assemblies are loaded in the core. A period of reactor operation from start-up of the reactor after loading of the new fuel assemblies to next shutdown of the reactor for replacement of the fuel assemblies is called a operation cycle.

Because of the loading of the new fuel assemblies, excess reactivity is increased at the beginning of the operation cycle. Control of the excess reactivity is important to keep constant a reactor power at the rated power (100% power) in the operation cycle. The excess reactivity is controlled by a burnable poison filled in a part of fuel rods and by insertion of control rods into the core. In the case of using a spectral shift rod, however, the excess reactivity is controlled by adjusting the level of the water surface in the rising pipe instead of manipulating the control rods. At the start-up of the reactor, the control rods are all withdrawn out of the core.

During the rated power operation at the early period of the operation cycle, the core flow rate is relatively small and the water surface is formed in the rising pipe. In this condition, the void fraction increases in upper portions of the fuel assemblies, and nuclear fission is suppressed to hold down the excess reactivity. Approaching the end of the operation cycle, the core flow rate increases and the level of the water surface in the rising pipe rises. This phenomenon is equivalent to a lowering of the void fraction. Nuclear fission is more activated with a rise of the level of the water surface. At the time of reaching a certain point in the operation cycle, the rising pipe is filled with water.

The above-cited JP, A, 63-73187, U.S. Pat. No. 5,023,047, U.S. Pat. No. 5,640,435, and Hitachi Hyoron, Vol. 74, No. 10 (1992) describe adjustment of the core output during the rated power operation. At the beginning of the operation cycle, the neutron moderating effect is reduced and U-235 is less consumed. At the same time, U-238 occupying a large part of the fuel material absorbs fast neutrons, whereupon Pu-239 is produced. Filling the rising pipe with the water in the late period of the operation cycle to enhance the neutron moderating effect promotes nuclear fission of U-235 and Pu-239. Consequently, production of Pu-239 is promoted and nuclear fission of Pu-239 is developed in the late period of the operation cycle, thus resulting in a saving of U-235 (uranium conservation).

In each operation cycle of a BWR, the core flow rate and the control rod manipulation are controlled in an automatic manner during a period from an low end at the automatic flow control range (described later), which represents a setting flow rate with respect to the core flow rate, until the reactor core power reaches the rated power. When the core flow rate is smaller than the low end at the automatic flow control range, the core flow rate and the control rod manipulation are controlled in a manual manner. In a predetermined range of the core flow rate from the rated power operation to the low power operation (hereinafter referred to the non-rated power operation), the core flow rate can be automatically controlled. At a low end of the automatic flow control range corresponding to the non-rated power operation (i.e., at the low end at the automatic flow control range), it is required to satisfy certain minimum restrictions of the core preset on the nuclear thermal-hydraulic stability from the standpoint of ensuring safety.

The above-cited JP, A, 63-73187, U.S. Pat. No. 5,023,047, U.S. Pat. No. 5,640,435, and Hitachi Hyoron, Vol. 74, No. 10 (1992) primarily intend to adjust the power during the rated power operation, namely to vertically change the level of the water surface in the rising pipe during the rated power operation. As an incidental advantage, the spectral shift rods described in those known references have a possibility that the nuclear thermal-hydraulic stability at the low end at the automatic flow control range during the non-rated power operation is slightly improved. Those spectral shift rods have however drawbacks below.

Because of a water surface being present in the rising pipe during the rated power operation, supposing if the core flow rate should abruptly increase due to, e.g., an abnormal condition occurred in a pump control system, this would possibly cause an abrupt rise of the water surface and abruptly increase an amount of water in the reactor core, thus resulting in a difficulty in suppressing a rising rate of the reactor power. In other words, there has been such a risk that influences of a transient event such as an increase of the core flow rate cannot be always avoided with sufficient reliability.

Additionally, U.S. Pat. No. 4,708,846 discloses, though not a spectral shift rod, a water rod having a rising pipe and a falling pipe which are communicated with each other. The disclosed water rod primarily intends to improve an ability of cooling fuel rods with water flowing out of an outlet of the falling pipe. The height from a lower end of the fuel effective length to the outlet of the falling pipe is set to be not less than 65% but not more than 75% of the fuel effective length.

SUMMARY OF THE INVENTION

An object of the present invention is to provide a boiling water reactor core, a boiling water reactor, and a method of operating the boiling water reactor which can suppress influences of a transient event during the rated power operation, and can improve the nuclear thermal-hydraulic stability during the non-rated power operation.

To achieve the above object, a first aspect of the present invention resides in a core of a boiling water reactor including fuel assemblies each comprising a plurality of fuel rods having a fuel effective length L, at least one water rod, an upper tie plate for holding upper end portions of the fuel rods and the water rod, a lower tie plate including a fuel holding portion to hold lower end portions of the fuel rods and the water rod, and a channel box surrounding an outer periphery of the fuel rods tied up into a bundle; and fuel support pieces for supporting the lower tie plates of the fuel assemblies, wherein the fuel support piece includes a first coolant passage formed therein and having an orifice with an inner diameter of about 6.2 cm; the fuel holding portion has a plurality of through holes for introducing a coolant in the lower tie plate to a second coolant passage defined between the fuel rods above the fuel holding portion, a total cross-sectional area S1 of all the through holes being smaller than a total cross-sectional area S2 of the second coolant passage; the water rod includes a rising passage opened to a space in the lower tie plate below the fuel holding portion and introducing upward the coolant introduced to the rising passage, and a falling passage communicated with the rising passage and introducing downward the coolant introduced through the rising passage, the falling passage having a coolant outlet opened to the second coolant passage above the fuel holding portion; the relationship of $0.2 \leq r \leq 0.4$ holds on an assumption that a ratio S1/S2 of the total cross-sectional area S1 to the total cross-sectional area S2 is r; and a height h from an upper surface of the fuel holding portion to the coolant outlet is set to satisfy the relationship of: $-2.1r^2+2.2r-0.3 \leq (h/L) < -2.2r^2+1.8r+0.04$.

To achieve the above object, a second aspect of the present invention resides in a core of a boiling water reactor including fuel assemblies each comprising a plurality of fuel rods having a fuel effective length L, at least one water rod, an upper tie plate for holding upper end portions of the fuel rods and the water rod, a lower tie plate including a fuel holding portion to hold lower end portions of the fuel rods and the water rod, and a channel box surrounding an outer periphery of the fuel rods tied up into a bundle; and fuel support pieces for supporting the lower tie plates of said fuel assemblies, wherein the fuel support piece includes a first coolant passage formed therein and having an orifice with an inner diameter of about 5.6 cm; the fuel holding portion has a plurality of through holes for introducing a coolant in the lower tie plate to a second coolant passage defined between the fuel rods above the fuel holding portion, a total cross-sectional area S1 of all the through holes being smaller than a total cross-sectional area S2 of the second coolant passage; the water rod includes a rising passage opened to a space in the lower tie plate below the fuel holding portion and introducing upward the coolant introduced to the rising passage, and a falling passage communicated with the rising passage and introducing downward the coolant introduced through the rising passage, the falling passage having a coolant outlet opened to the second coolant passage above the fuel holding portion; the relationship of $0.2 \leq r \leq 0.4$ holds on an assumption that a ratio S1/S2 of the total cross-sectional area S1 to the total cross-sectional area S2 is r; and a height h from an upper surface of the fuel holding portion to the coolant outlet is set to satisfy the relationship of: $-4.2r^2+3.4r-0.4 \leq (h/L) < -0.53r^2+0.5r+0.46$.

A coolant having entered the first coolant passage in the fuel support piece is introduced to the interior of the lower tie plate, passes the plurality of through holes formed in the fuel holding portion of the lower tie plate, and then flows into the second coolant passage to cool the fuel rods. Because a pressure loss is developed by the through holes in such a flow of the coolant, the pressure of the coolant in the second coolant passage is lower than the pressure of the coolant in the lower tie plate.

A part of the coolant having entered the first coolant passage rises in the rising passage of the water rod, falls in the falling passage thereof, and then flows out from the cooling outlet into the second coolant passage. By making the rising passage opened below the fuel holding portion, the pressure loss caused by the through holes in the fuel holding portion is negligible for the flow of the coolant flowing into the rising passage of the water rod. Therefore, a surface of the coolant is formed in the rising passage at a level corresponding to a pressure difference resulted from the pressure loss. More specifically, assuming that a height from an upper surface of the fuel holding portion to the coolant surface formed in the rising passage is H, the pressure at the coolant inlet of the rising passage is P1, the pressure at the coolant outlet of the falling passage is P2, the density of the coolant in the rising passage is $\rho$, and the acceleration of gravity is g, the height H is expressed by;

$$H=(P1-P2)/(\rho \times g)$$

Here, since the pressure P2 is reduced as the height h increases, the height H increases as the height h increases. The height H also varies depending on the ratio r of the total cross-sectional area S1 to the total cross-sectional area S2. In other words, as the ratio r becomes larger, the throttling effect developed by the through holes in the fuel holding portion reduces and the pressure loss also reduces. An increasing rate of the height H with respect to the height h is therefore reduced.

In view of the above, according to the first aspect of the present invention, the height h is set to satisfy the relationship of:

$$-2.1r^2+2.2r-0.3 \leq h/L \ (0.2 \leq r \leq 0.4)$$

and according to the second aspect of the present invention, the height h is set to satisfy the relationship of:

$$-4.2r^2+3.4r-0.4 \leq h/L \ (0.2 \leq r \leq 0.4)$$

By so setting, during the rated power operation of the reactor, the height H of the coolant surface in the rising passage can be made not less than 3.7 m that is the fuel effective length L. Accordingly, a region in the rising passage corresponding to at least the fuel effective length can be fully filled with the coolant. If there should occur a transient event such as an abrupt increase of a flow rate of the coolant supplied to the core due to, e.g., an abnormal condition occurred in a pump control system, a rising rate of the reactor power would be small because the region in the rising passage corresponding to the fuel effective length is originally fully filled with the coolant. As a result, the first and second aspects of the present invention can suppress influences of the transient event during the rated power operation.

Further, according to the first aspect of the present invention, the height h is set to satisfy the relationship of:

$$h/L < -2.2r^2 + 1.8r + 0.04 \ (0.2 \leq r \leq 0.4)$$

and according to the second aspect of the present invention, the height h is set to satisfy the relationship of:

$$h/L < -0.53r^2 + 0.5r + 0.46 \ (0.2 \leq r \leq 0.4)$$

By so setting, at least at the low end at the automatic flow control range during the non-rated power operation in which the reactor power is lower than that during the rated power operation, a surface of the coolant is formed in the region in the rising passage corresponding to the fuel effective length, and a vapor zone is formed in the rising passage above the coolant surface. Therefore, the void fraction in the core is increased to reduce the neutron moderating effect, whereby the reactor power is suppressed. As a result, the nuclear thermal-hydraulic stability of the core during the non-rated power operation is improved.

To achieve the above object, a third aspect of the present invention resides in a core of a boiling water reactor including fuel assemblies each comprising a plurality of fuel rods having a fuel effective length L, at least one water rod, an upper tie plate for holding upper end portions of the fuel rods and the water rod, a lower tie plate including a fuel holding portion to hold lower end portions of the fuel rods and the water rod, and a channel box surrounding an outer periphery of the fuel rods tied up into a bundle; and fuel support pieces for supporting the lower tie plates of the fuel assemblies, wherein the fuel support piece includes a first coolant passage formed therein and having an orifice with an inner diameter in the range of not less than 5.6 cm but not more than 6.2 cm; the fuel holding portion has a plurality of through holes for introducing a coolant in the lower tie plate to a second coolant passage defined between the fuel rods above the fuel holding portion, a total cross-sectional area S1 of all the through holes being smaller than a total cross-sectional area S2 of the second coolant passage; the water rod includes a rising passage opened to a space in the lower tie plate below the fuel holding portion and introducing upward the coolant introduced to the rising passage, and a falling passage communicated with the rising passage and introducing downward the coolant introduced through the rising passage, the falling passage having a coolant outlet opened to the second coolant passage above the fuel holding portion; the relationship of $0.2 \leq r \leq 0.4$ holds on an assumption that a ratio S1/S2 of the total cross-sectional area S1 to the total cross-sectional area S2 is r; and a height h from an upper surface of the fuel holding portion to the coolant outlet is set to satisfy the relationship of: $-4.2r^2 + 3.4r - 0.4 \leq (h/L) < -2.2r^2 + 1.8r + 0.04$.

With the third aspect, influences of the transient event during the rated power operation can be surely suppressed over the entire range of the inner diameter of the orifice from about 5.6 cm to about 6.2 cm, and the nuclear thermal-hydraulic stability of the core during the non-rated power operation can be improved.

To achieve the above object, a fourth aspect of the present invention resides in a method of operating a boiling water reactor wherein the rising passage is filled with the coolant during a period of rated power operation, and a surface of the coolant is formed in the rising passage during a period of non-rated power operation in which a flow rate of the coolant supplied to the fuel assemblies is lower than that during the period of rated power operation.

With the above operating method, influences of the transient event during the rated power operation can be suppressed, and the nuclear thermal-hydraulic stability of the core during the non-rated power operation can be improved.

DESCRIPTION OF THE PREFERRED EMBODIMENTS

Figure 1:
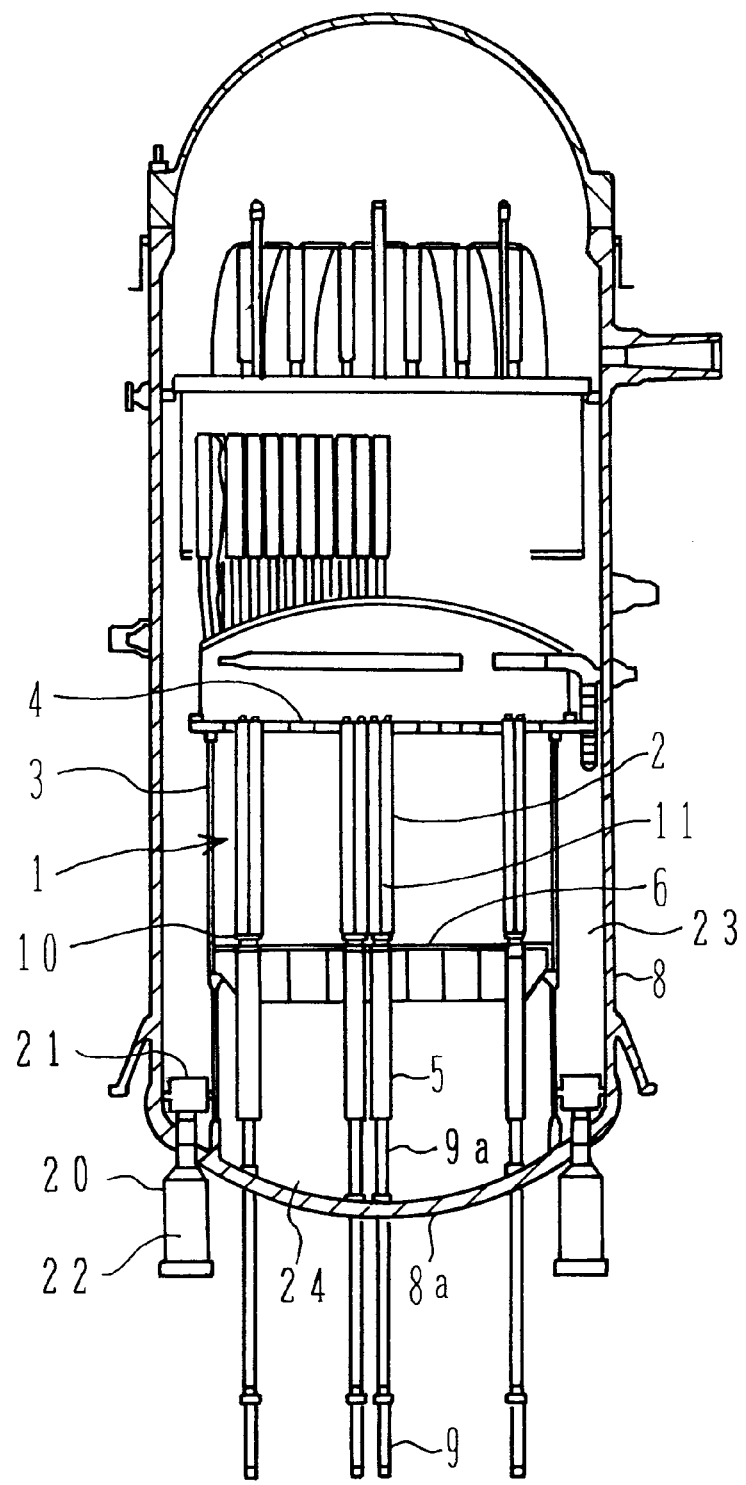
FIG. 1 is a vertical sectional view of a boiling water reactor including a core according to one preferred embodiment of the present invention.

The nuclear thermal-hydraulic stability of a BWR is more stable at lower reactor output if the core flow rate is the same. In view of that point, an embodiment of the present invention is based on the concept below. The liquid (coolant) surface varying function of the spectral shift rod is applied to the non-rated power operation to drop a level of the water surface in a rising pipe at a low core flow rate near the low end at the automatic flow control range. Correspondingly, an amount of the coolant (water) in fuel assemblies is relatively reduced and a moderating rate of neutrons is also reduced, thereby producing a lower reactor output than the case of the water surface being not formed. This lowering of the reactor output necessarily increases an allowance for the nuclear thermal-hydraulic stability of a reactor core at the low end at the automatic flow control range.

A BWR core according to a preferred embodiment of the present invention will be described below with reference to FIGS. 1 to 7. The BWR includes a core shroud 3 disposed inside a reactor pressure vessel 8. Within the core shroud 3, a core 1 is formed of a number of fuel assemblies 2 arrayed in the form of a square lattice. Upper end portions of the fuel assemblies 2 are supported by an upper lattice plate 4, which is fixed to an upper portion of the core shroud 3, in such a manner that the fuel assemblies 2 are restrained from moving horizontally. A core lower portion supporting plate 6 is mounted to the core shroud 3 and is positioned at a lower end portion of the core 1. Control rods 11 each having a cruciform cross-section are inserted between the fuel assemblies 2 through control rod guide pipes 5, and are driven by control rod driving mechanism 9 provided below the reactor pressure vessel 8.

Figure 2:
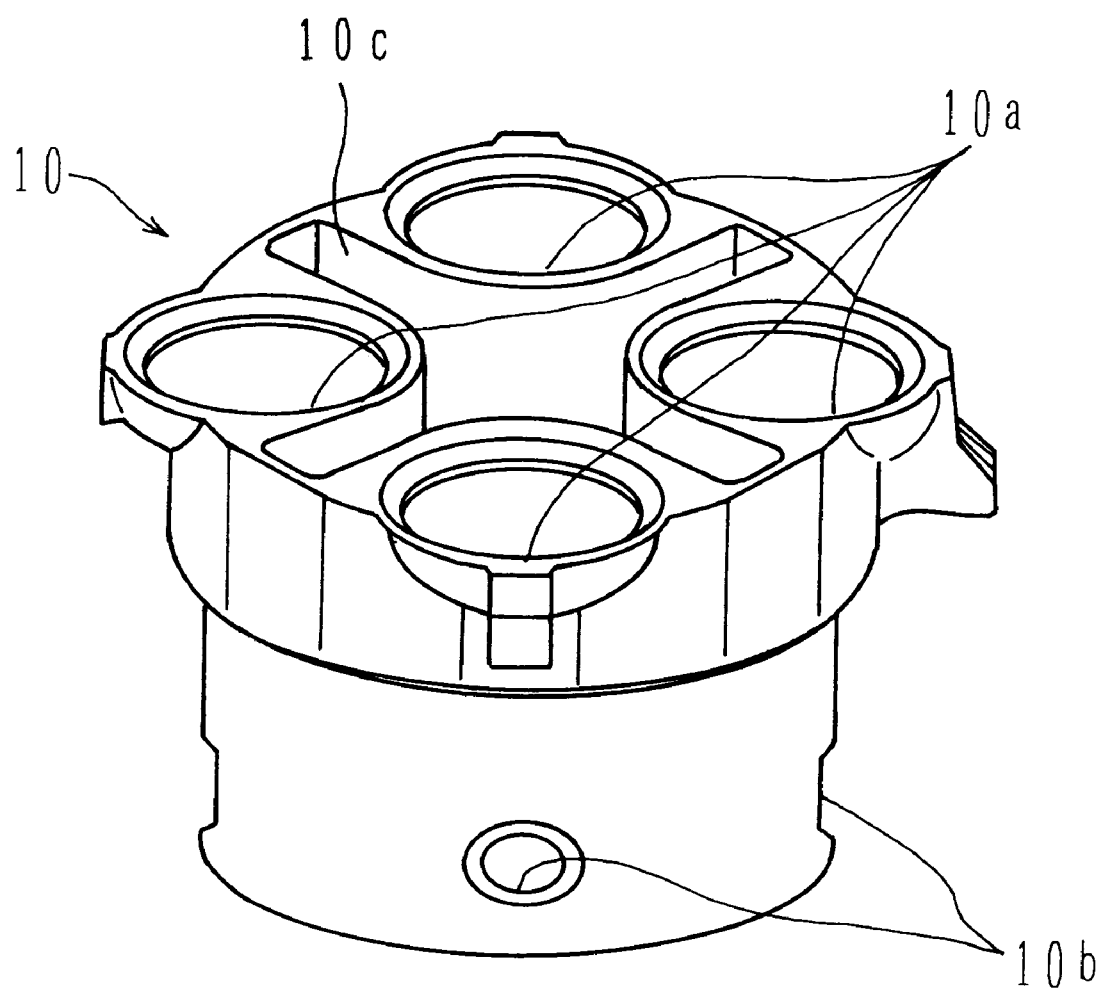
FIG. 2 is a perspective view a fuel support piece used in the boiling water reactor shown in FIG. 1.

Fuel support pieces 10, shown in FIG. 2, are provided respectively at the top portion of the control rod guide pipes 5 and penetrates the core lower portion supporting plate 6. Four fuel assemblies 2 are inserted in and held by four insertion holes 10a formed in the fuel support piece 10, respectively. A load of the fuel assemblies 2 is finally supported by a bottom plate 8a of the reactor pressure vessel 8 through the fuel support piece 10, the control rod guide pipe 5, and a housing 9a of the control rod driving mechanism 9. In a side surface of the fuel support piece 10, four orifices 10b'' are formed to take in a coolant (cooling water) flowing externally. These orifices 10b are communicated respectively with the corresponding insertion holes 10a. An inner diameter d of the orifice 10b differs depending on the type of the reactor. In this embodiment, the diameter d is about 6.2 cm that is primarily used in BWRs having electric power of 1.1 million KW class. The fuel support piece 10 has a cross-shaped hole 10c which is formed between the four insertion holes 10a and receives the control rod 11.

A plurality of internal pumps 20 are provided at the bottom the reactor pressure vessel 8. Each of the internal pumps 20 comprises a pump portion 21 including an impeller, and a motor portion 22 including a motor coupled to the impeller. The pump portion 21 is arranged in an annular passage 23 formed between the reactor pressure vessel 8 and the core shroud 3. The motor portion 22 is positioned outside the reactor pressure vessel 8.

Figure 3:
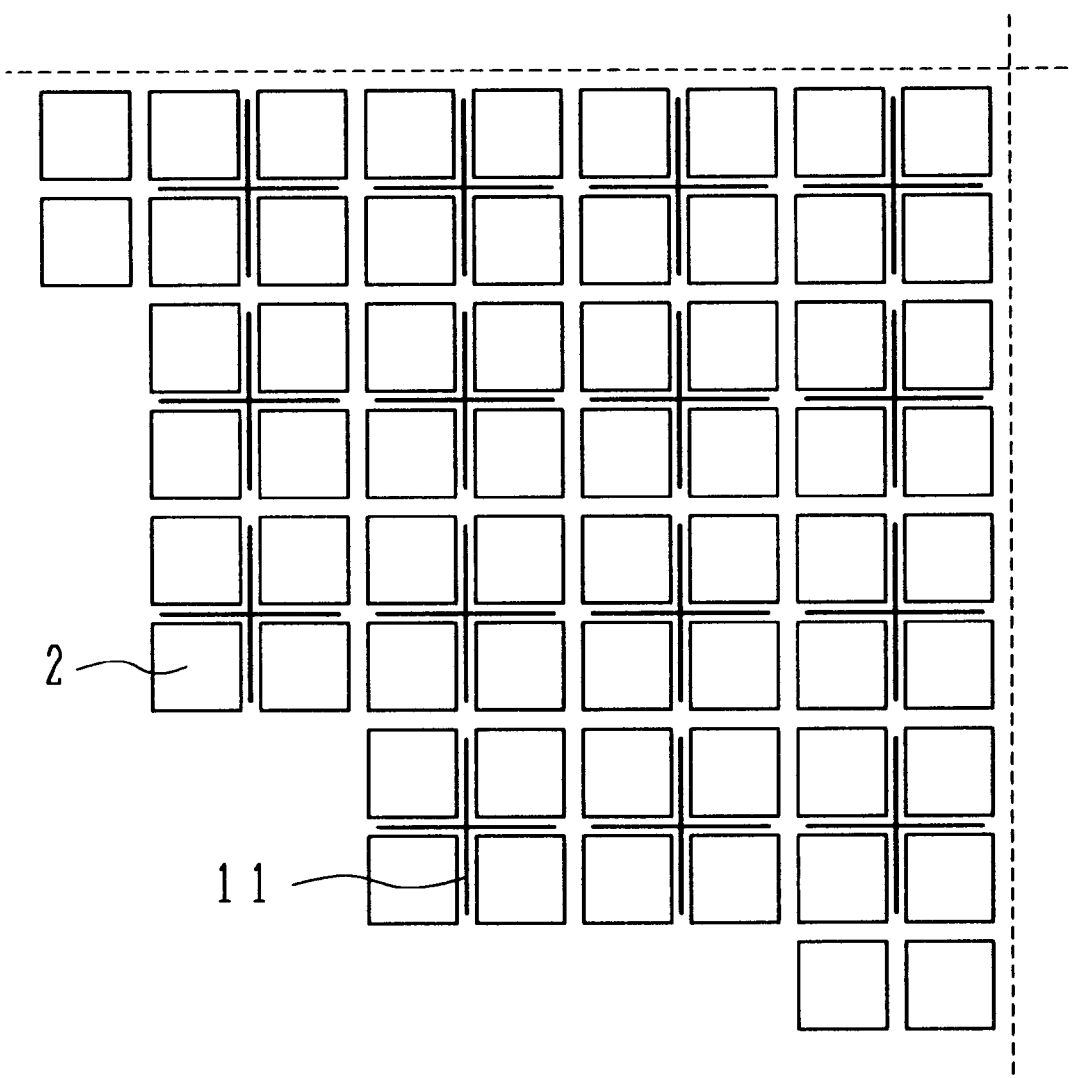
FIG. 3 is a horizontal cross-sectional view of a part of the core shown in FIG. 1.
Figure 4:
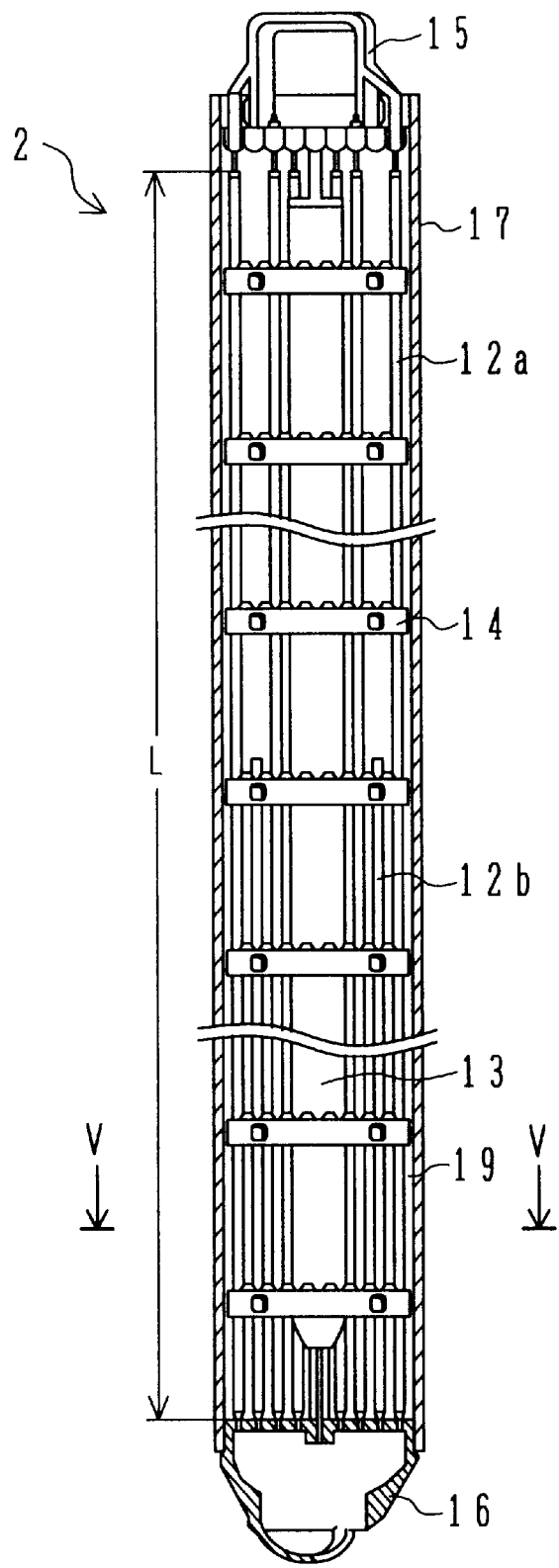
FIG. 4 is a vertical sectional view of fuel assemblies loaded into the core shown in FIG. 1.

The core 1 is constructed, as shown in FIG. 3, by arranging each four fuel assemblies 2 around one control rod 11. Each control rod 11 is positioned adjacent to two sides of each fuel assembly 2.

A detailed structure of the fuel assembly 2 will be described below with reference to FIGS. 4, 5, 6 and 7. The fuel assembly 2 comprises 74 fuel rods 12 arrayed in the form of a 9-row, 9-column square lattice, two water rods (spectral shift rods) 13 arrange in an area capable of accommodating seven fuel rods 12, a plurality of spacers 14 for holding spacings between adjacent ones of the fuel rods 12 and the water rods 13 to set values, and an upper tie plate 15 and a lower tie plate 16 for holding respectively upper and lower end portions of the fuel rods 12 and the water rods 13. A channel box 17 surrounds an outer periphery of a bundle of fuel rods 12 held together by the fuel spacers 14.

Figure 5:
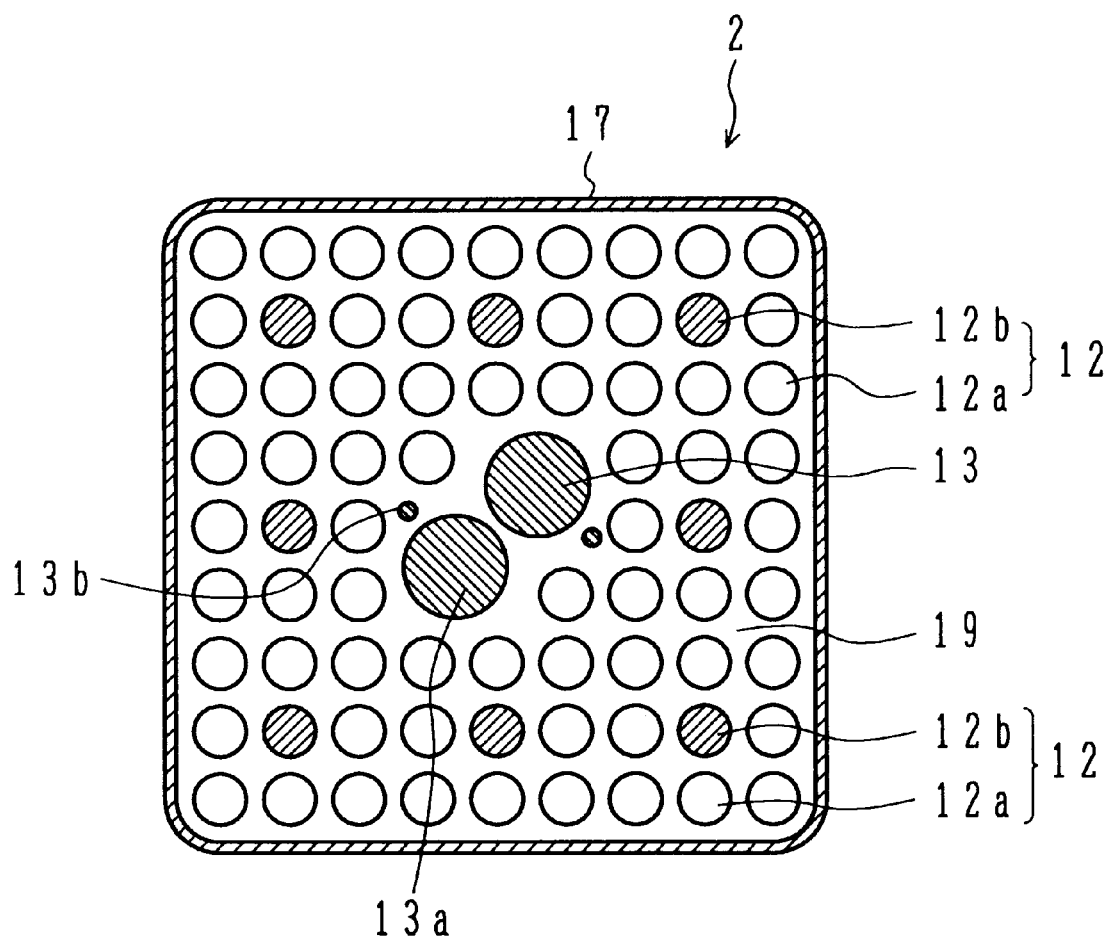
FIG. 5 is a sectional view taken along line V—V in FIG. 4.

Each of the fuel rods 12 comprises, though not shown, a cladding pipe which is made of a zirconium alloy and is filled with uranium fuel pellets containing U-235, U-238, etc. The fuel rods 12 include full-length fuel rods 12a having a fuel effective length L (corresponding to a portion where the fuel pellets are present) equal to a normal full length, and partial-length fuel rods 12b having a fuel effective length L shorter than that of the full-length fuel rods 12a. The total length of the partial-length fuel rod 12b is shorter than that of the full-length fuel rods 12a. The fuel assembly 2 is made up of 66 full-length fuel rods 12a and 8 partial-length fuel rods 12b. The partial-length fuel rods 12b are arranged in the second layer counting from the outermost side, as shown in FIG. 5.

Figure 6:
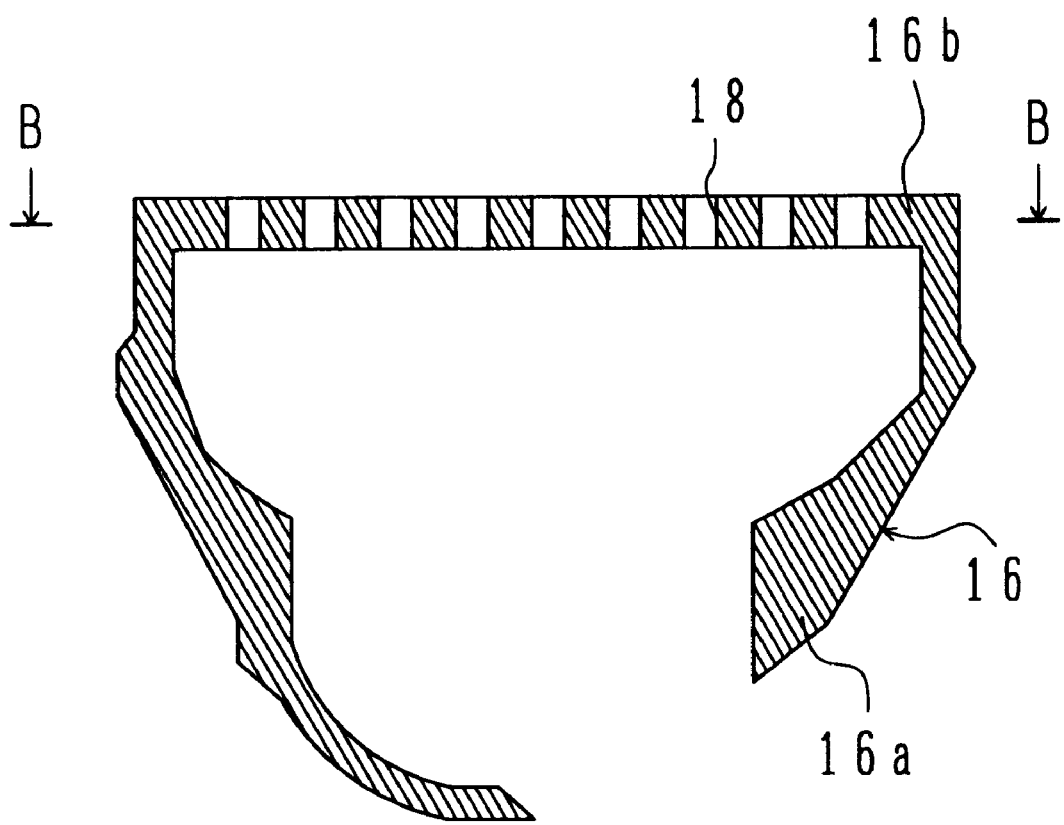
FIG. 6 is a vertical sectional view of a lower tie plate shown in FIG. 4.

The lower tie plate 16 comprises, as shown in FIG. 6, a lower end portion 16a and a fuel rod holding portion 16b. The lower end portion 16a has an opening formed therein for introducing the cooling water supplied through the insertion hole 10a in the fuel support piece 10. The fuel rod holding portion 16b has a plurality of through holes 18 for introducing the cooling water to a cooling water passage 19 formed between the fuel rods 12, and holds the lower end portions of the fuel rods 12. A flow passage area ratio r (=S1/S2) of a total cross-sectional area (total cross-sectional area as viewed in a section B—B in FIG. 6) S1 of all the through holes 18 to a total cross-sectional area (total cross-sectional area as viewed in a section V—V in FIG. 4) S2 of the cooling water passage 19 in the channel box 17 is 0.3.

Figure 7:
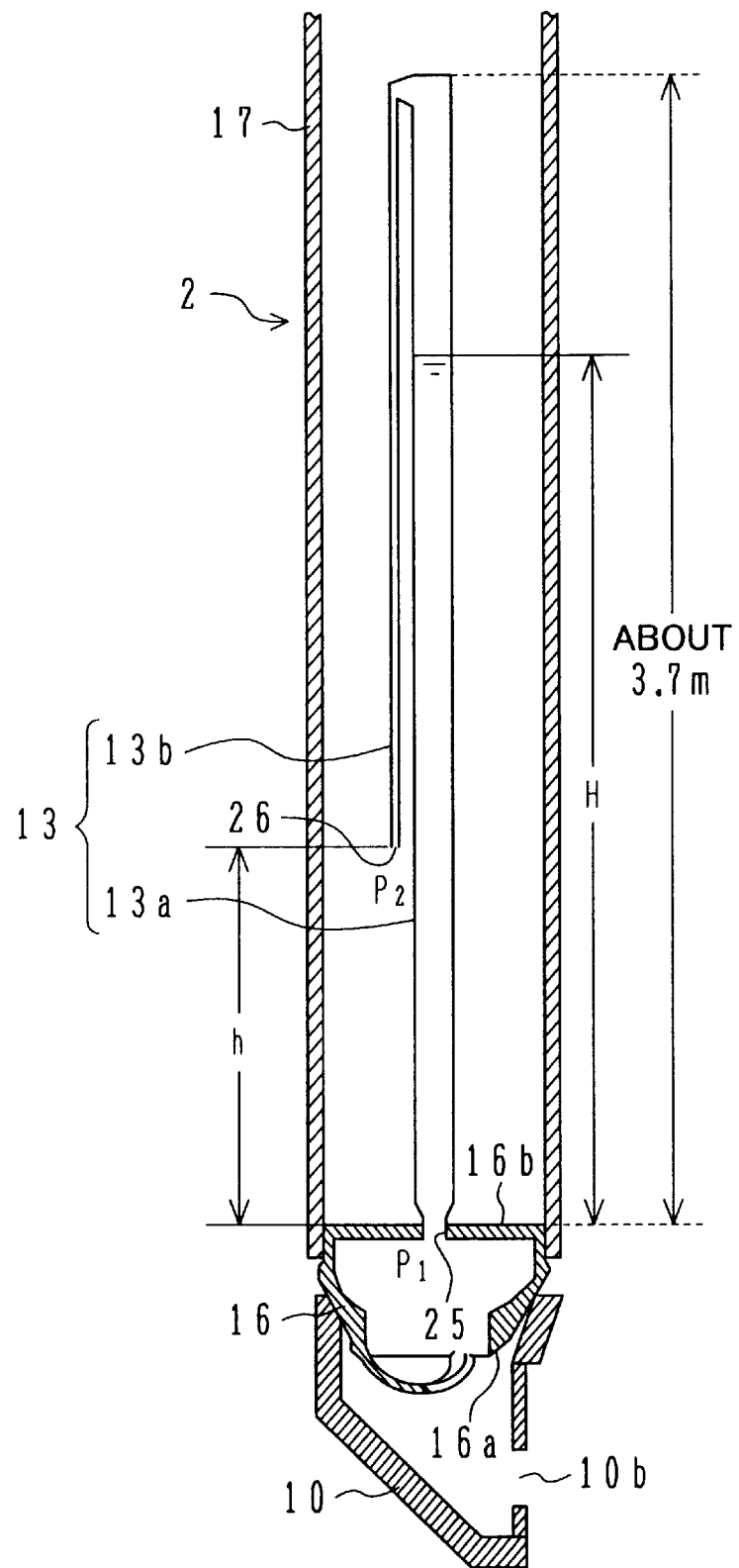
FIG. 7 is a vertical sectional view of a water rod shown in FIG. 4.

The water rod 13 comprises, as shown in FIG. 7, a rising pipe 13a for introducing upward the cooling water introduced from the interior of the lower tie plate 16, and a falling pipe 13b communicated with an upper end portion of the rising pipe 13a for introducing downward the cooling water introduced from the rising pipe 13a. The rising pipe 13a has a cooling water inlet 25 formed at its lower end portion. The cooling water inlet 25 is positioned at the same height as (or lower than) the fuel rod holding portion 16b. The falling pipe 13b has a cooling water outlet 26 formed at its lower end portion. A height (outlet height) h from an upper surface of the fuel rod holding portion 16b to the cooling water outlet 26 is set to satisfy the following relationship:

$$-2.1r^2+2.2r-0.3 \leq (h/L) < -2.2r^2+1.8r+0.04 \quad (1)$$

The upper surface of the fuel rod holding portion 16b lies substantially at the same level as the lower end position of the fuel effective length L of the fuel rod 12.

The position at which the rising pipe 13a of the water rod 13 communicates with the falling pipe 13b thereof lies near (or above) the upper end of the fuel effective length L of the full-length fuel rod 12a. The height from the upper surface of the fuel rod holding portion 16b to the communicating portion between the rising pipe 13a and the falling pipe 13b is about 3.7 m (the fuel effective length L).

The operation of this embodiment will be described below. Upon driving of the internal pumps 20, the cooling water is forced to flow in a lower plenum 24 through the annular passage 23. The cooling water flows into the interior of the fuel support piece 10 through the orifices 10b, and is then introduced to the interior of the lower tie plate 16 through a cooling water passage formed in the fuel support piece 10. Most of the cooling water flows into the cooling water passage 19 via the through holes 18 to cool the fuel rods 12a and 12b. Because of a pressure loss due to a throttling effect developed by the through holes 18, the pressure of the cooling water after having passed the through holes 18 is lower than the pressure of the cooling water before passing the through holes 18.

The remainder of the cooling water introduced to the interior of the lower tie plate 16 flows into the rising pipe 13a of the water rod 13 through the cooling water inlet 25. After rising in the rising pipe 13a, the cooling water falls in the falling pipe 13b and then flows out externally of the water rod 13 through the cooling water outlet 26. Since the pressure loss caused by the through holes 18 is negligible for the flow of the cooling water passing the water rod 13, a surface of the cooling water (liquid) is formed in the rising pipe 13a at a level corresponding to a pressure difference resulted from the pressure loss due to the throttling effect developed by the through holes 18.

More specifically, a height (water surface level) H from the upper surface of the fuel rod holding portion 16b to the water surface formed in the rising pipe 13a is expressed by;

$$H=(P1-P2)/(\rho \times g) \tag{2}$$

where P1 is the pressure at the cooling water inlet 25, P2 is the pressure at the cooling water outlet 26, p is the density of the cooling water in the rising pipe 13a, and g is the acceleration of gravity. Since the pressure P2 is reduced as the outlet height h increases, the water surface level H rises as the outlet height h increases.

In this embodiment, the problems in the rated power operation and the non-rated power operation are solved by utilizing such a property of the water surface level in the rising pipe 13a. Specifically, in the rated power operation, the cooling water is always filled in the rising pipe 13a, and therefore influences of a transient event can be suppressed with sufficient reliability. Also, in the non-rated power operation, the water surface level in the rising pipe 13a is lowered to reduce an amount of the cooling water in the fuel assemblies 2, whereby the reactor output can be suppressed to improve the nuclear thermal-hydraulic stability sufficiently. These two types of functions will be described below one by one.

(1) Function in Rated power Operation

Figure 8:
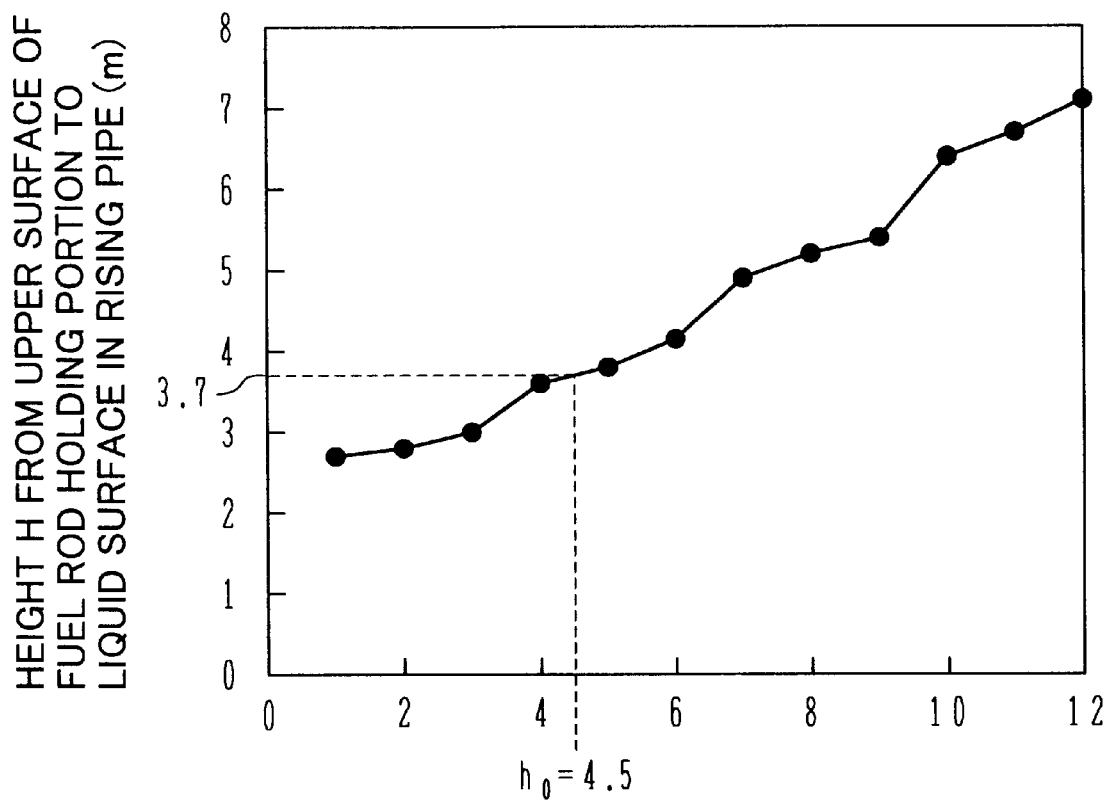
FIG. 8 is a characteristic graph showing the relationship between a water outlet height h and a water surface level H at the rated power and the core flow rate of 90%.

First, the inventors studied influences of the outlet height h and the water surface level H in the rated power operation, and obtained results shown in FIG. 8. The results of FIG. 8 were obtained by employing a core (comparative core) having the same structure as the core 1 of this embodiment, and determining values of the water surface level H with analysis while the outlet height h was changed variously, on condition that the comparative core is at the rated power and the core flow rate is minimum, i.e., that the reactor output is 100% of the rated value and the core flow rate is 90% of the rated value. Incidentally, the flow passage area ratio r in the comparative core is fixed to 0.3 as with this embodiment. The rising pipe 12a in the comparative core has however no limitations in length. In the graph of FIG. 8, the horizontal axis represents the outlet height h in units of nodes scaled by 24-division of the fuel effective length L. The water surface level H represented by the vertical axis means the height (m) from the upper surface of the fuel rod holding portion 16b to the water surface.

As is apparent from FIG. 8, as the outlet height h increases, the water surface level H also increases. For example, the water surface level H takes H≈2.6 (m) at h=1 (node), takes H≈3.7 (m) at h≈4.5 (node), and amounts to H≈7.2 (m) at h≈12 (node). Accordingly, assuming that the length of the rising pipe 13a is, e.g., 3.7 m corresponding to the fuel effective length L, if the coolant outlet 26 is positioned near the upper surface of the fuel rod holding portion 16b (namely, h≈0) as disclosed in the above-cited JP, A, 63-73187, U.S. Pat. No. 5,023,047, U.S. Pat. No. 5,640, 435, and *Hitachi Hyoron*, Vol. 74, No. 10 (1992), the water surface is formed at a level corresponding to H≈2.5 m, and a portion of the rising pipe 13a above the water surface becomes a vapor zone. On the other hand, if the outlet height h is set to satisfy h≧4.5, H≧3.7 (m) is obtained, thus meaning that the water surface is not formed in the rising pipe 13a and the rising pipe 13a is fully filled with the cooling water. In this case, a limit height $h_0$ of the outlet height h capable of filling the rising pipe 13a with the cooling water is 4.5 (node). Additionally, the reason why the water surface level H does not change smoothly with respect to an increase of the outlet height h in FIG. 8 is that the cross-sectional area of the cooling water passage in the fuel assembly 2 is partially reduced at the positions of the fuel spacers 14 and the pressure loss is increased correspondingly.

Such an h-H characteristic also varies depending on the flow passage area ratio r. Specifically, a larger flow passage area ratio r reduces the throttling effect developed by the through holes 18 and hence the pressure loss, whereby an increasing rate of the water surface level H with respect to the outlet height h lowers. As a result, the limit height $h_0$ of the outlet height h capable of filling the rising pipe 13a with the cooling water is increased.

Figure 9:
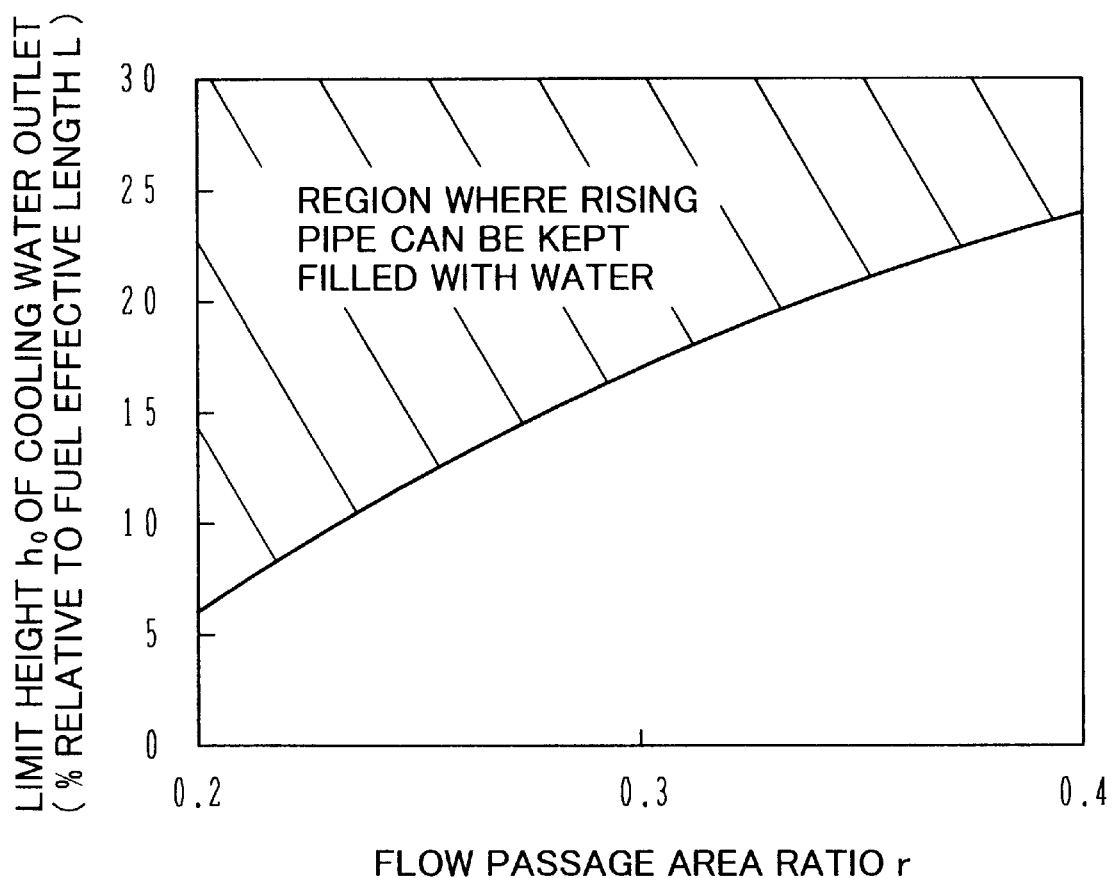
FIG. 9 is a characteristic graph showing the relationship between a flow passage area ratio r and a limit height $h_0$ of the water outlet height h at the rated power and the core flow rate of 90%.

Then, the inventors studied influences of the limit height $h_0$ of the outlet height h in the rated power operation, and obtained results shown in FIG. 9. The characteristic of FIG. 9 was obtained by, as with the case of FIG. 8, employing a core (comparative core) having the same structure as the core 1 of this embodiment, and determining values of the limit height $h_0$ of the outlet height h with analysis, at which H=3.7 is obtained, while the flow passage area ratio r was changed variously from 0.2 to 0.4, on condition that the comparative core is at the rated power and the core flow rate is minimum. Incidentally, in the graph of FIG. 9, the vertical axis represents the limit height ho as a relative value with the fuel effective length L set to 100%.

As is apparent from FIG. 9, as the flow passage area ratio r increases, the limit height $h_0$ also increases. For example, the limit height $h_0$ takes $h_0$≈6 (%) at r=0.2, $h_0$≈17 (%) at r=0.3, and $h_0$≈24 (%) at r=0.4. The characteristic curve of FIG. 9 is expressed by:

$$h_0=-210r^2+220r-30 \tag{3}$$

In a region lying on and above the characteristic curve expressed by the formula (3), i.e., in a region meeting;

$$h_0 \geq 210r^2+220r-30 \tag{4}$$

H≧3.7 is obtained. This means that when the length of the rising pipe 13a is 3.7 m corresponding to the fuel effective length L, the rising pipe 13a can be kept fully filled with the cooling water.

Accordingly, if the outlet height h (m) satisfies the following relationship on condition that the flow passage area ratio r is in the range of 0.2≦r≦0.4;

$$h/L \geq -2.1r^2+2.2r-0.3 \tag{5}$$

the rising pipe 13a of 3.7 m can be kept fully filled with the cooling water.

In the core 1 of this embodiment, it is possible to always maintain the water surface level H not lower than 3.7 m and to keep the rising pipe 13a of 3.7 m fully filled with the cooling water during the rated power operation by satisfying the conditions of 0.2≦r≦0.4 and $-2.1r^2+2.2r-0.3$≦h/L. Accordingly, unlike the conventional structure wherein the water surface is formed in the rising pipe during the rated power operation, if there should occur a transient event such as an abrupt increase of the core flow rate due to, e.g., an abnormal condition occurred in the control system for the internal pumps 20, a rising rate of the reactor output would be small because the rising pipe 13a is originally fully filled with the cooling water. As a result, this embodiment can suppress influences of the transient event with sufficient reliability. In other words, safety of the reactor can be further improved.

While the above description has been made, by way of example, in connection with the case under conditions of the core being at the rated power and the core flow rate being 90% of the rated value, when the core flow rate is larger than 90% of the rated value, a value of the right side (P1−P2) in the formula (2) becomes larger and the water surface level H rises as compared with that resulted in the above case of the minimum core flow rate.

(2) Function in Non-rated power Operation

Figure 10:
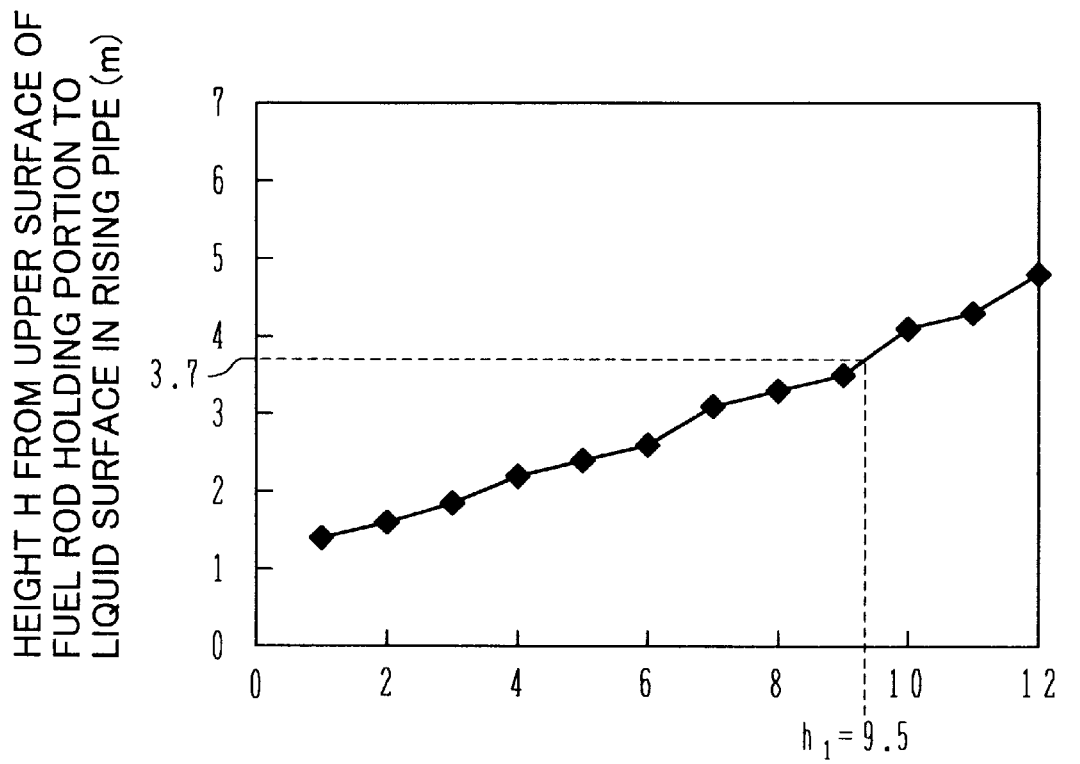
FIG. 10 is a characteristic graph showing the relationship between the water outlet height h and the water surface level H at the reactor power of 90% and the core flow rate of 65%.

Next, the inventors studied influences of the outlet height h and the water surface level H in the non-rated power operation during which the core flow rate and the reactor output are lower than those in the rated power operation, and obtained results shown in FIG. 10. The results of FIG. 10 were obtained by employing a core (comparative core) having the same structure as the core 1 of this embodiment, and determining values of the water surface level H with analysis while the outlet height h was changed variously, under condition at the above-described low end at the automatic flow control range in the non-rated power operation (here, on condition that the reactor output is 90% of the rated value and the core flow rate is 65% of the rated value). Incidentally, as with the case of FIG. 8, the flow passage area ratio r is fixed to 0.3 and the rising pipe 12a has no limitations in length. The horizontal axis and the vertical axis represent the same parameters as those in the graph of FIG. 8.

As is apparent from FIG. 10, similarly to the case of FIG. 8, as the outlet height h increases, the water surface level H also increases. However, the values of the water surface level H are smaller as a whole than those in FIG. 8. For example, the water surface level H takes H≈1.4 (m) at h=1 (node), H≈3.7 (m) at h≈9.5 (node), and H≈4.6 (m) at h≈12 (node). Accordingly, assuming that the length of the rising pipe 13a is, e.g., 3.7 m corresponding to the fuel effective length L, if the outlet height h is set to satisfy h<9.5, the water surface appears in the rising pipe 13a, and a vapor zone is formed in a portion of the rising pipe 13a above the water surface. In this case, a limit height $h_1$ of the outlet height h capable of forming the water surface in the rising pipe 13a is 9.5 node.

Figure 11:
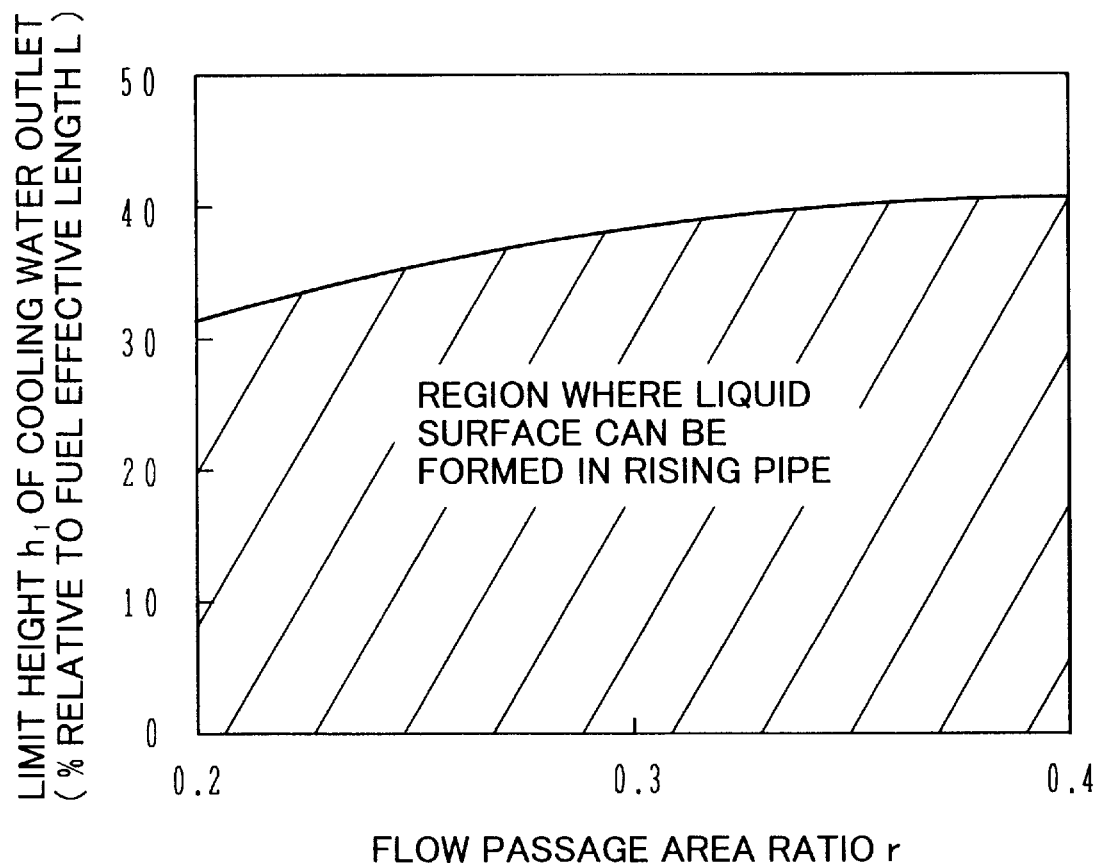
FIG. 11 is a characteristic graph showing the relationship between the flow passage area ratio r and a limit height $h_1$ of the water outlet height h at the reactor output of 90% and the core flow rate of 65%.

Then, the inventors studied influences of the limit height $h_1$ of the outlet height h in the non-rated power operation, and obtained results shown in FIG. 11. The characteristic of FIG. 11 was obtained by, as with the case of FIG. 9, determining values of the limit height $h_1$ of the outlet height h with analysis, at which H=3.7 is obtained, while the flow passage area ratio r was changed variously from 0.2 to 0.4. In the graph of FIG. 11, the vertical axis represents the limit height $h_1$ as a relative value like that in FIG. 9.

As is apparent from FIG. 11, similarly to the case of FIG. 9, as the flow passage area ratio r increases, the limit height $h_1$ also increases. However, an increasing rate of the limit height $h_1$ is smaller than in FIG. 9. The reason is that because the cooling water outlet 26 is positioned much above the upper surface of the fuel rod holding portion 16b, the pressure loss in the cooling water passage 19 corresponding to a level difference from the upper surface of the fuel rod holding portion 16b to the cooling water outlet 26 is increased and the influence of the flow passage area ratio r is reduced. Further, the values of the limit height $h_1$ itself are larger as a whole than those in FIG. 9. For example, the limit height $h_1$ takes $h_1$≈32 (%) at r=0.2, $h_1$≈37 (%) at r=0.3, and $h_1$≈41 (%) at r=0.4. The characteristic curve of FIG. 11 is expressed by:

$$h_1 = -220r^2 + 180r + 4 \qquad (6)$$

In a region below the characteristic curve expressed by the formula (6), i.e., in a region meeting;

$$h_1 < -220r^2 + 180r + 4 \qquad (7)$$

H<3.7 is obtained. This means that when the length of the rising pipe 13a is 3.7 m corresponding to the fuel effective length L, the water surface can be formed in the rising pipe 13a.

Accordingly, if the outlet height h (m) satisfies the following relationship on condition that the flow passage area ratio r is in the range of 0.2<r<0.4;

$$h/L < -2.2r^2 + 1.8r + 0.04 \qquad (8)$$

the water surface can be formed in the rising pipe 13a of 3.7 m and a vapor zone can be formed in a portion of the rising pipe 13a above the water surface.

In the core 1 of this embodiment, it is possible to set the water surface level H to be lower than 3.7 m and to form the water surface in the rising pipe 13a and a vapor zone above the water surface at least at the low end at the automatic flow control range in the non-rated power operation by satisfying the conditions of 0.2<r<0.4 and $h/L < -2.2r^2 + 1.8r + 0.04$. With this embodiment, therefore, the void fraction in the fuel assemblies 2 can be increased to reduce the neutron moderating effect, whereby the reactor output can be suppressed to improve the nuclear thermal-hydraulic stability of the core 1 sufficiently in the non-rated power operation.

Additionally, it is a principal rule that operation of the reactor below the core flow rate range at the rated power is performed, as mentioned above, when the reactor is started and stopped. During such operation, a possibility that there occurs an event like an abrupt increase of the core flow rate, such as assumed in the above (1), is much lower than during the rated power operation. Therefore, the formation of the water surface in the rising pipe 13a, when the reactor is in the low core flow rate range as encountered in the starting and stopping periods thereof, hardly raises significant problems in comparison with the period of the rated power operation.

According to this embodiment, as described above, since the outlet height h is set to satisfy the relationship of $-2.1r^2 + 2.2r - 0.3 \leq h/L < -2.2r^2 + 1.8r + 0.04$ under condition of $0.2 \leq r \leq 0.4$, influences of the transient event during the rated power operation can be suppressed with sufficient reliability, while the nuclear thermal-hydraulic stability of the core during the non-rated power operation can be sufficiently improved.

This embodiment can also provide an advantage below. In the conventional structure wherein the water surface is formed in the rising pipe during the rated power operation, no problems occur in usual reactor output control because the level of the water surface in the rising pipe can be approximately calculated based on the core flow rate. However, when there is a need for achieving a core control ability with higher accuracy, it is required to actually measure the water surface level by a detector or the like. Manufacture of such a detector or the like pushes up a cost and reduces economy of the reactor. Also, a difficulty arises in installing the detector in a limited space inside the fuel assembly.

According to this embodiment, the rising pipe 13a is fully filled with water during the rated power operation. Thus, since the reactor output control is performed on condition that the rising pipe 13a is always fully filled with water, highly accurate control can be achieved in this embodiment without providing such a detector or the like. As a result, this embodiment can improve economy of the reactor in comparison with the conventional structure.

The above-mentioned advantages can also be provided in the case of using fuel assemblies having the fuel effective length L other than 3.7 m. Specifically, neutrons leak in a considerable amount to the outside of the core near at the upper end of the fuel effective length L, and change of the fuel effective length L at the upper end of the fuel effective causes no significant influence upon the pressure loss characteristic in the lower portion of the fuel assembly 2. Thus, even if the fuel effective length L is changed on the order of 0.1 m, the same advantages as described above can be obtained.

The through holes 18 in the fuel rod holding portion 16b are simply cylindrical in shape, and the total cross-sectional area S1 of the through holes 18 as viewed in the section taken along line B—B in FIG. 6 gives a minimum value of the total cross-sectional area S1. When the through holes 18 have, for example, any other complex shape, the total cross-sectional area S1 is given by a minimum total cross-sectional area of the through holes 18 in the direction of height thereof.

In this embodiment, the orifices 10b in the fuel support piece 10 are formed in the side surface of the fuel support piece 10. However, so long as the same pressure loss characteristic is obtained by the through holes 18 which restrict an expanded flow of the cooling water, the orifices 10b may be formed in a lower surface, an oblique surface as viewed from the horizontal surface, or a curved surface. Further, the shape of each orifice 10b is not necessarily required to be circuit, but may be, e.g., elliptic, rectangular or triangular so long as the same pressure loss characteristic is obtained based on the restriction of an expanded flow of the cooling water.

The water rod 13 is not necessarily required to have the structure shown in FIG. 7. So long as the conditions of the above formulae (5) and (8) are satisfied, the water rod 13 may have the structure of a water rod having a rising passage and a falling passage, as disclosed in JP, A, 63-73187 and JP, B, 7-89158, for example. Also, the overall length of the water rod 13 is not limited to 3.7 m, but may be longer than 3.7 m. Further, the position at which the rising pipe 13a and the falling pipe 13b communicate with each other is not necessarily limited to the vicinity of the upper end of the water rod 13. It is just essential that the length of the communicating position between both the pipes to the lower end of the water rod is about 3.7 m or more. These modifications can also provide similar advantages as described above.

While this embodiment uses the fuel assembly having a 9-row, 9-column array of fuel rods, the present invention is also applicable to a fuel assembly having a 10-row, 10-column array of fuel rods.

While the inner diameter d of the orifices 10b in the fuel support piece 10 is set to about 6.2 cm in this embodiment, the inner diameter d may have other value in some cases. In an advanced boiling water reactor (ABWR), for example, the fuel support piece 10 having the orifices 10b with the inner diameter d of about 5.6 cm is primarily employed. A BWR core including such a fuel support piece will be described below as another embodiment of the present invention. In another embodiment, the construction except the fuel support piece is the same as that of the above embodiment (first embodiment) having been described in connection with FIGS. 1 to 7.

(A) Case of d≈5.6 (cm)

Figure 12:
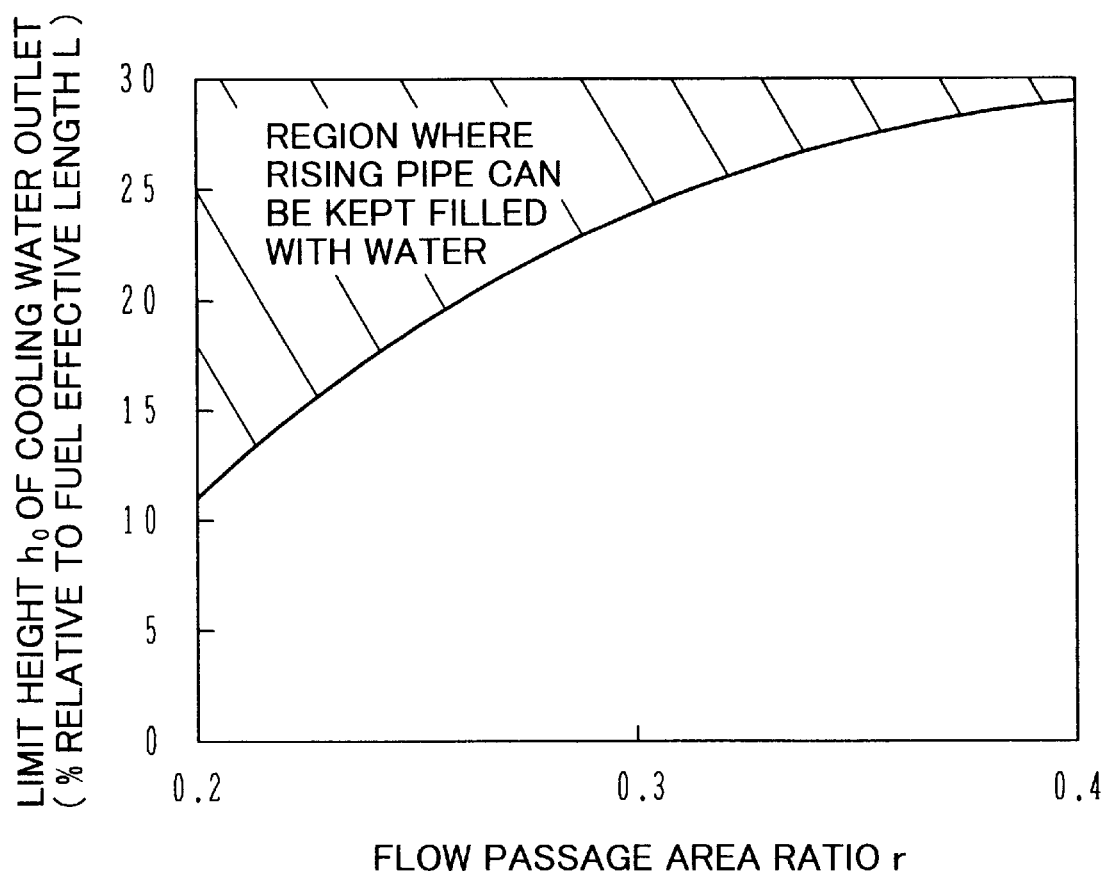
FIG. 12 is a characteristic graph showing the relationship between the flow passage area ratio r and the limit height $h_0$ of the water outlet height h at the rated reactor output and the core flow rate of 90% resulted when an inner diameter of an orifice in the fuel support piece is about 5.6 cm.

For a core which has the same structure as the first embodiment and includes the fuel support piece 10 having the orifices 10b with the inner diameter d of about 5.6 cm, the inventors studied influences of the limit height $h_0$ of the outlet height h in the rated power operation, and obtained results shown in FIG. 12. Also, the inventors studied influences of the limit height $h_1$ of the outlet height h at the low end at the automatic flow control range (where the reactor output and the core flow rate are respectively about 70% and about 50% of those in the rated power operation), and obtained results shown in FIG. 13. The FIGS. 12 and 13 correspond respectively to FIGS. 9 and 11 for the first embodiment.

As is apparent from FIG. 12, for example, the limit height $h_0$ takes $h_0 \approx 12$ (%) at r=0.2, $h_0 \approx 24$ (%) at r=0.3, and $h_0 \approx 28$ (%) at r=0.4. The characteristic curve of FIG. 12 is expressed by:

$$h_0 = -420r^2 + 340r - 40 \qquad (9)$$

In a region lying on and above the characteristic curve expressed by the formula (9), i.e., in a region meeting;

$$h_0 \geq -420r^2 + 340r - 40 \qquad (10)$$

H≥3.7 is obtained. This means that when the length of the rising pipe 13a is 3.7 m corresponding to the fuel effective length L, the rising pipe 13a can be kept fully filled with the cooling water during the rated power operation.

Accordingly, if the outlet height h (m) satisfies the following relationship on condition that the flow passage area ratio r is in the range of 0.2≤r≤0.4;

$$h/L \geq -4.2r^2 + 3.4r - 0.4 \qquad (11)$$

the rising pipe 13a of 3.7 m can be kept fully filled with the cooling water.

Figure 13:
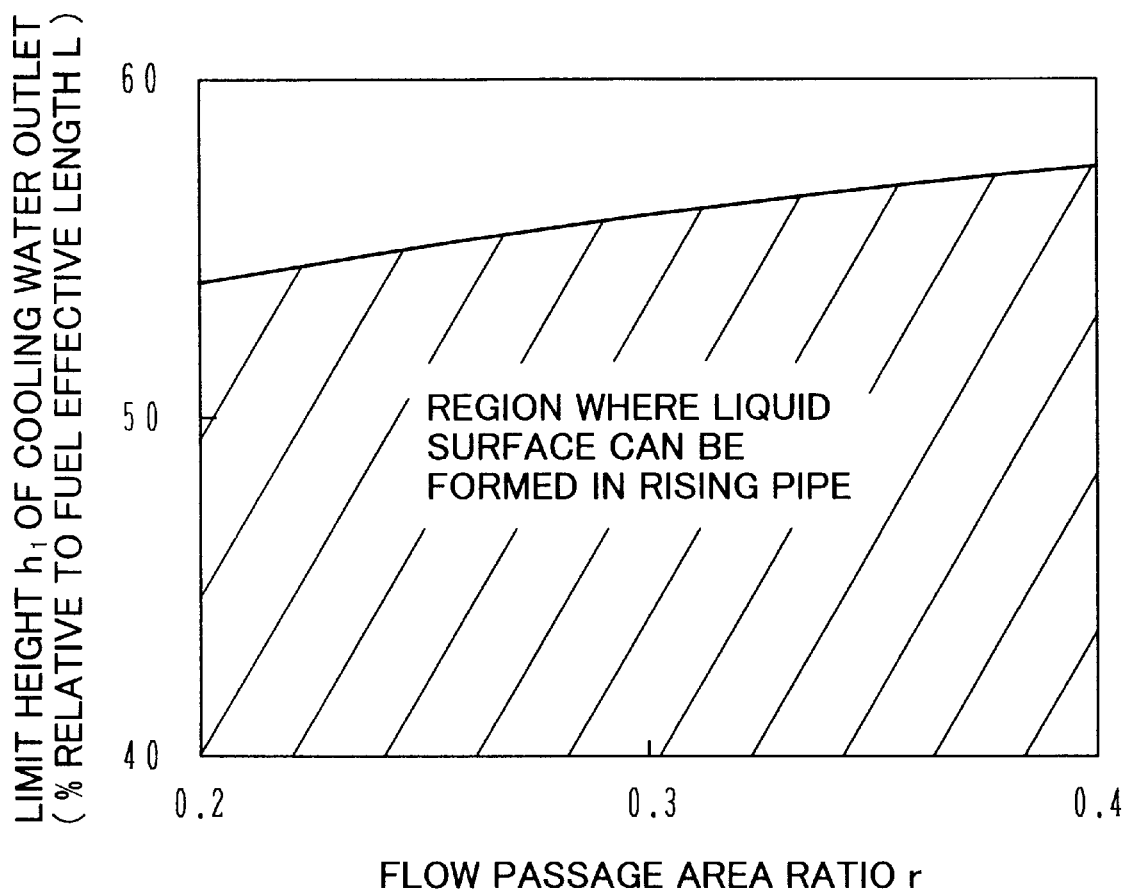
FIG. 13 is a characteristic graph showing the relationship between the flow passage area ratio r and the limit height $h_1$ of the water outlet height h at the reactor output of 90% and the core flow rate of 65% resulted when the inner diameter of the orifice in the fuel support piece is about 5.6 cm.

As is apparent from FIG. 13, for example, the limit height $h_1$ takes $h_1 \approx 54$ (%) at r=0.2, $h_1 \approx 56$ (%) at r=0.3, and $h_1 \approx 58$ (%) at r=0.4. The characteristic curve of FIG. 13 is expressed by:

$$h_1 = -53r^2 + 50r + 46 \qquad (12)$$

In a region below the characteristic curve expressed by the formula (12), i.e., in a region meeting;

$$h_1 < -53r^2 + 50r + 46 \qquad (13)$$

H (the water surface level in the rising pipe)<3.7 is obtained. This means that when the length of the rising pipe 13a is 3.7 m corresponding to the fuel effective length L, the water surface can be formed in the rising pipe 13a.

Accordingly, if the outlet height h (m) satisfies the following relationship on condition that the flow passage area ratio r is in the range of 0.2≤r≤0.4;

$$h/L < -0.53r^2 + 0.5r + 0.46 \qquad (14)$$

the water surface can be formed in the rising pipe 13a of 3.7 m and a vapor zone can be formed in a portion of the rising pipe 13a above the water surface.

With this embodiment wherein the inner diameter d of the orifices 10b in the fuel support piece 10 is set to about 5.6 cm, similar advantages as those in the first embodiment can also be obtained by setting the outlet height so as to satisfy the condition of:

$$-4.2r^2+3.4r-0.4 \leq (h/L) < -0.53r^2+0.5r+0.46$$

(B) Case of Inner Diameter d being Larger Than 5.6 cm but Smaller Than 6.2 cm

Comparing the first embodiment with the embodiment (second embodiment) described in the above (A), it is seen that the relationship between the outlet height h and the water surface level H is changed depending on the inner diameter d of the orifices 10b formed in the side surface of the fuel support piece 10. Accordingly, there exists some range of the outlet height h which can be used in one of the first and second embodiments, but cannot be used in the other. To cope with such a range of the outlet height h, two types of water rods 13 each comprising the rising pipe 13a and the falling pipe 13b require to be fabricated depending on the inner diameter d of the orifices 10b, thus resulting in an increased production cost.

In view of the above, by taking the logical product of the conditions expressed by the formulae (5) and (8) and the conditions expressed by the formulae (11) and (12), the outlet height h can be used for any of d≈5.6 cm, d≈6.2 cm, and 5.6 cm≦d≦6.2 cm. The resulting logical product is given by a region between the characteristic curve of FIG. 12 and the characteristic curve of FIG. 11, the region being expressed by:

$$-4.2r^2+3.4r-0.4 \leq (h/L) < -2.2r^2+1.8r+0.04 \quad (15)$$

Similar advantages as those in the first embodiment can also be obtained by a core constructed by loading fuel assemblies including the water rods 13 for each of which the outlet height h is set to satisfy the condition of the above formula (15). Further, since those fuel assemblies can be loaded in cores provided with fuel support pieces having orifices with its inner diameter d ranging from about 5.6 cm to about 6.2 cm, fuel economy can be improved.

What is claimed is:

1. A core of a boiling water reactor including fuel assemblies each comprising a plurality of fuel rods having a fuel effective length L, at least one water rod, an upper tie plate for holding upper end portions of said fuel rods and said water rod, a lower tie plate including a fuel holding portion to hold lower end portions of said fuel rods and said water rod, and a channel box surrounding an outer periphery of said fuel rods tied up into a bundle; and fuel support pieces for supporting said lower tie plates of said fuel assemblies, wherein:

said fuel support piece includes a first coolant passage formed therein and having an orifice with an inner diameter of at least 5.6 cm;

said fuel holding portion has a plurality of through holes for introducing a coolant in said lower tie plate to a second coolant passage defined between said fuel rods above said fuel holding portion, a total cross-sectional area S1 of all said through holes being smaller than a total cross-sectional area S2 of said second coolant passage;

said water rod includes a rising passage opened to a space in said lower tie plate below said fuel holding portion and introducing upward the coolant introduced to said rising passage, and a falling passage communicated with said rising passage and introducing downward the coolant introduced through said rising passage, said falling passage having a coolant outlet opened to said second coolant passage above said fuel holding portion;

the relationship of 0.2≦r≦0.4 holds on an assumption that a ratio S1/S2 of said total cross-sectional area S1 to said total cross-sectional area S2 is r; and a height h from an upper surface of said fuel holding portion to said coolant outlet is set to satisfy at least one of relationship (a), (b) and (c) of:

(a) $-2.1r^2+2.2r-0.3 \leq (h/L) < -2.2r^2+1.8r+0.04$;

(b) $-4.2r^2+3.4r-0.4 \leq (h/L) < -0.53r^2+0.5r+0.46$; and (c) $-4.2r^2+3.4r-0.4 \leq (h/L) < -2.2r^2+1.8r+0.04$.

2. A core of a boiling water reactor according to claim 1, wherein said first coolant passage having said orifice has said inner diameter of not more than 6.2 cm.

3. A core of a boiling water reactor according to claim 1, wherein said first coolant passage has said orifice with said inner diameter of about 6.2 cm.

4. A core of a boiling water reactor according to claim 3, wherein the relationship (a) of:

$-2.1r^2+2.2r-0.3 \leq (h/L) < -2.2r^2+1.8r+0.04$ is satisfied.

5. A boiling water reactor including the core of claim 4 installed in a reactor vessel.

6. A boiling water reactor including the core of claim 1 installed in a reactor vessel.

7. A core of a boiling water reactor including fuel assemblies each comprising a plurality of fuel rods having a fuel effective length L, at least one water rod, an upper tie plate for holding upper end portions of said fuel rods and said water rod, a lower tie plate including a fuel holding portion to hold lower end portions of said fuel rods and said water rod, and a channel box surrounding an outer periphery of said fuel rods tied up into a bundle; and fuel support pieces for supporting said lower tie plates of said fuel assemblies, wherein:

said fuel support piece includes a first coolant passage formed therein and having an orifice with an inner diameter of about 6.2 cm;

said fuel holding portion has a plurality of through holes for introducing a coolant in said lower tie plate to a second coolant passage defined between said fuel rods above said fuel holding portion, a total cross-sectional area S1 of all said through holes being smaller than a total cross-sectional area S2 of said second coolant passage;

said water rod includes a rising passage opened to a space in said lower tie plate below said fuel holding portion and introducing upward the coolant introduced to said rising passage, and a falling passage communicated with said rising passage and introducing downward the coolant introduced through said rising passage, said falling passage having a coolant outlet opened to said second coolant passage above said fuel holding portion;

the relationship of 0.2≦r≦0.4 holds on an assumption that a ratio S1/S2 of said total cross-sectional area S1 to said total cross-sectional area S2 is r; and a height h from an upper surface of said fuel holding portion to said coolant outlet is set to satisfy the relationship of:

$-2.1r^2+2.2r-0.3 \leq (h/L) < -2.2r^2+1.8r+0.04$.

8. A boiling water reactor including the core of claim 1 installed in a reactor vessel.

9. A core of a boiling water reactor according to claim 7, wherein said rising passage is filled with coolant during a period of rated power operation, and a surface of the coolant is formed in said rising passage during a period of non-rated power operation in which a flow rate of the coolant supplied to said fuel assemblies is lower than that during the period of said rated power operation.

10. A core of a boiling water reactor including fuel assemblies each comprising a plurality of fuel rods having a fuel effective length L, at least one water rod, an upper tie plate for holding upper end portions of said fuel rods and said water rod, a lower tie plate including a fuel holding portion to hold lower end portions of said fuel rods and said water rod, and a channel box surrounding an outer periphery of said fuel rods tied up into a bundle; and fuel support pieces for supporting said lower tie plates of said fuel assemblies, wherein:

said fuel support piece includes a first coolant passage formed therein and having an orifice with an inner diameter of about 5.6 cm;

said fuel holding portion has a plurality of through holes for introducing a coolant in said lower tie plate to a second coolant passage defined between said fuel rods above said fuel holding portion, a total cross-sectional area S1 of all said through holes being smaller than a total cross-sectional area S2 of said second coolant passage;

said water rod includes a rising passage opened to a space in said lower tie plate below said fuel holding portion and introducing upward the coolant introduced to said rising passage, and a falling passage communicated with said rising passage and introducing downward the coolant introduced through said rising passage, said falling passage having a coolant outlet opened to said second coolant passage above said fuel holding portion;

the relationship of $0.2 \leq r \leq 0.4$ holds on an assumption that a ratio S1/S2 of said total cross-sectional area S1 to said total cross-sectional area S2 is r; and a height h from an upper surface of said fuel holding portion to said coolant outlet is set to satisfy the relationship of:

$-4.2r^2+3.4r-0.4 \leq (h/L) < -0.53r^2+0.5r+0.46$.

11. A boiling water reactor including the core of claim 10 installed in a reactor vessel.

12. A core of a boiling water reactor including fuel assemblies each comprising a plurality of fuel rods having a fuel effective length L, at least one water rod, an upper tie plate for holding upper end portions of said fuel rods and said water rod, a lower tie plate including a fuel holding portion to hold lower end portions of said fuel rods and said water rod, and a channel box surrounding an outer periphery of said fuel rods tied up into a bundle; and fuel support pieces for supporting said lower tie plates of said fuel assemblies, wherein:

said fuel support piece includes a first coolant passage formed therein and having an orifice with an inner diameter in the range of not less than 5.6 cm but not more than 6.2 cm;

said fuel holding portion has a plurality of through holes for introducing a coolant in said lower tie plate to a second coolant passage defined between said fuel rods above said fuel holding portion, a total cross-sectional area S1 of all said through holes being smaller than a total cross-sectional area S2 of said second coolant passage;

said water rod includes a rising passage opened to a space in said lower tie plate below said fuel holding portion and introducing upward the coolant introduced to said rising passage, and a falling passage communicated with said rising passage and introducing downward the coolant introduced through said rising passage, said falling passage having a coolant outlet opened to said second coolant passage above said fuel holding portion;

the relationship of $0.2 \leq r \leq 0.4$ holds on an assumption that a ratio S1/S2 of said total cross-sectional area S1 to said total cross-sectional area S2 is r; and a height h from an upper surface of said fuel holding portion to said coolant outlet is set to satisfy the relationship of:

$-4.2r^2+3.4r-0.4 \leq (h/L) < -2.2r^2+1.8r+0.04$.

13. A boiling water reactor including the core of claim 12 installed in a reactor vessel.

* * * * *